United States Patent [19]

Stachowiak

[11] 4,030,290
[45] June 21, 1977

[54] JET ENGINE THRUST REVERSER

[75] Inventor: Claude R. Stachowiak, Renton, Wash.

[73] Assignee: The Boeing Company, Seattle, Wash.

[22] Filed: Nov. 6, 1974

[21] Appl. No.: 521,264

[52] U.S. Cl. .............................. 60/226 A; 60/229; 239/265.33; 251/212; 239/265.27; 60/230

[51] Int. Cl.² .......................................... F02K 3/02

[58] Field of Search ............... 60/226 A, 228, 229, 60/226 R, 230, 232; 239/265.33, 265.37, 265.27; 251/212

[56] References Cited

UNITED STATES PATENTS

| | | | |
|---|---|---|---|
| 2,878,643 | 3/1959 | Fox | 60/237 |
| 3,034,296 | 5/1962 | Keen | 60/229 |
| 3,040,524 | 6/1962 | Kurti | 60/226 A |
| 3,050,937 | 8/1962 | James | 60/229 X |
| 3,475,913 | 11/1969 | Mortlock | 60/229 |
| 3,747,341 | 7/1973 | Davis | 60/226 A |
| 3,794,246 | 2/1974 | Weise | 60/229 |
| 3,824,785 | 7/1974 | Soligny | 60/226 A |

FOREIGN PATENTS OR APPLICATIONS

| | | | |
|---|---|---|---|
| 1,294,283 | 5/1969 | Germany | 60/226 A |

*Primary Examiner*—Clarence R. Gordon

*Attorney, Agent, or Firm*—Christensen, O'Connor, Garrison & Havelka

[57] ABSTRACT

A thrust reverser suitable for reversing the flow direction of the fan air of a fan jet engine is disclosed. The thrust reverser comprises a cascade section and a fan duct blocker section. The cascade section includes a series of cascade elements mounted in a side-by-side manner about a portion of the engine nacelle for rotation through an arc of 90° about longitudinal axes lying generally parallel to the direction of fan air flow. Each cascade element includes an inner panel, an outer panel, and a series of vanes located between the inner and outer panels. Rotation is between a closed position whereat the inner panel forms a portion of the fan air duct and the outer panel forms a portion of the outer surface of the nacelle, and an open position whereat the vanes define passageways adapted to reverse fan air flow i.e., direct fan air flow back toward the front of the engine. The fan duct blocker section comprises a series of blocker elements linked together and lying about the inner wall of the fan air duct between the cascade elements and the aft end of the fan air duct. The blocker elements are adapted to fan outwardly and form a door that blocks the fan air duct when the cascade elements are in their open position.

15 Claims, 10 Drawing Figures

JET ENGINE THRUST REVERSER

BACKGROUND OF THE INVENTION

This invention is directed to jet engines and more particularly to thrust reversers for jet engines.

Various types of apparatus have been proposed for reversing the thrust of jet engines. One of the most common devices for reversing the flow of the fan air of a fan jet engine includes cascades formed in the engine nacelle and a means for exposing the cascades when reverse thrust is desired, in combination with a mechanism for blocking fan air flow in the fan air duct aft of the cascades. In general, such prior art devices expose the cascades by moving or retracting a cover usually formed of a heavy ring that surrounds the nacelle. As the cover is retracted, blocker doors are moved to a position whereat they block the normal fan air duct outlet. One of the major disadvantages of this structure is weight, which comes from the relatively heavy cover utilized to control the exposure of the open cascades and the heavy mechanism needed to operate the cover. A further disadvantage relates to the length of the path of travel traversed by the cover. Specifically, because the longitudinal distance of this path is substantial, it places undesirable restrictions on engine design.

Therefore, it is an object of this invention to provide a new and improved thrust reverser.

It is a further object of this invention to provide a thrust reverser suitable for reversing the thrust of the fan air of a fan jet engine.

It is yet another object of this invention to provide a lightweight thrust reverser suitable for use in a jet engine to reverse fan air flow.

It is a still further object of this invention to provide a new and improved thrust reverser that is lightweight and only moves through a relatively short path of travel.

It is also an object of this invention to provide a new and improved thrust reverser for use in a jet engine that is radially located about the engine nacelle in a position that reverses air flow along the most desirable path.

SUMMARY OF THE INVENTION

In accordance with principles of this invention, a thrust reverser suitable for reversing the thrust of a jet engine is provided. Preferably, the invention is used to reverse fan air flow and comprises a cascade section and a fan duct blocker section. The cascade section comprises a series of cascade elements mounted in a side-by-side manner about a portion of the periphery of the engine nacelle. Each cascade element comprises an inner panel, an outer panel and a plurality of vanes located between the inner and outer panels. The cascade elements are adapted to rotate about axes lying generally parallel to the normal fan air flow path. The inner panel forms a portion of the fan air duct and the outer panel forms a portion of the outer surface of the engine nacelle when the cascades are in a closed position i.e., fan air is flowing in its normal longitudinal direction through the fan air duct. The cascade elements are rotatable through 90° to an open position whereat the vanes are adapted to direct fan air in a reverse direction i.e., generally back toward the air intake of the associated jet engine. The blocker section comprises a plurality of blocker doors located between the cascade section and the aft end of the fan air duct. In their open position, the blocker doors are interleaved one upon another and form a portion of the inner wall of the fan air duct. In their closed position the blocker doors fan outwardly and block the fan air duct.

In accordance with further principles of this invention, the inner and outer panels of the cascade elements overlap one another when the cascade elements are in their closed positions. Further, the cascade elements are mechanically connected together and operated by a single driving source.

In accordance with still other principles of this invention, the blocker doors are linked together and connected to a single driving source.

In accordance with still further principles of this invention, the blocker door section includes a ring linked to each blocker door and a suitable mechanical mechanism adapted to rotate the ring through an arc adequate to fan the blocker doors outwardly from a nonblocking position to a fan air duct blocking position.

It will appreciated from the foregoing brief summary that the invention comprises a thrust reverser suitable for use in reversing the flow direction of the exhaust of a jet engine. The invention is particularly suitable for reversing the flow direction of the fan air of a fan jet engine. The invention overcomes many of the disadvantages of prior art reversers in that the path of travel or the flow reversing mechanism is small, particularly when compared to most prior art devices. Moreover, the invention provides a reverse structure that is substantially lighter in weight than is the most commonly used prior art structure wherein a heavy cover is moved longitudinally to expose cascades.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
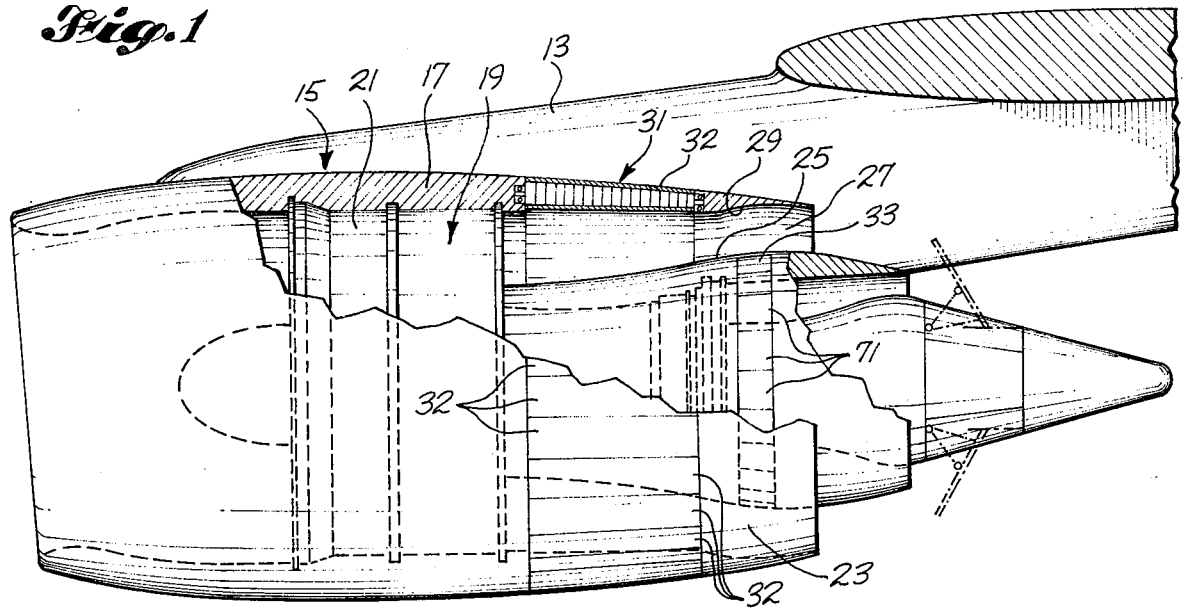
FIG. 1 is a side view, partially in section, illustrating a fan jet engine incorporating the present invention.

FIG. 1 is an elevational view partially in section illustrating a preferred embodiment of the invention and comprises a wing 11 supporting a forwardly and downwardly extending strut 13. In a conventional manner, the strut supports a fan jet engine 15.

The fan jet engine 15 includes a nacelle 17 surrounding the turbine portions 19 of the fan jet engine. The turbine portions 19 include a fan air compression section 21 and a high pressure compression section 23. In a conventional manner, the outer fairing for the high pressure compression section 23 forms the inner wall 25 of a fan air duct 27 disposed rearwardly of the fan air compression section 21. The outer wall 29 of the fan air duct 27 is defined by the inner surface of the engine nacelle 17.

The thrust reverser of the invention comprises two sections—a cascade section 31 and a blocker section 33. The cascade section 31 generally comprises a plurality of peripherally located cascade elements 32 each of which includes a plurality of cascade vanes 39. The blocker section 33 generally comprises a plurality of blocker doors adapted to move between a position whereat they form a portion of the inner wall of the fan air duct 27 and a position whereat they block the flow of fan air through the normal aft outlet of the fan air duct 27.

CASCADE SECTION

Figure 4:
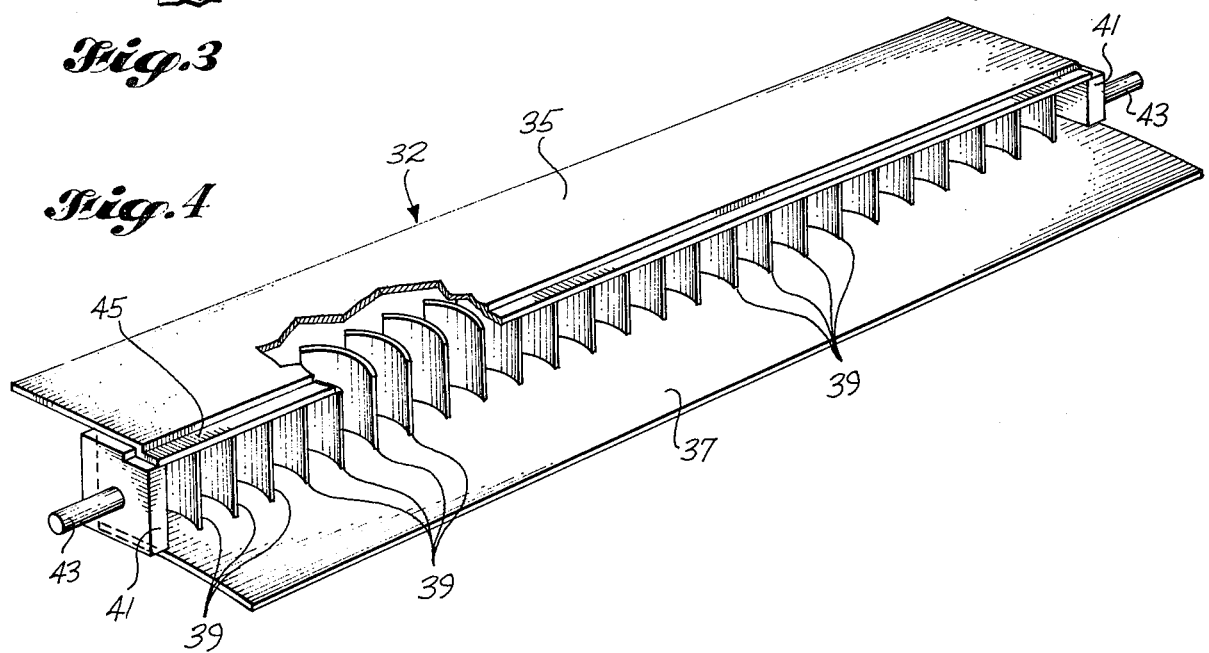
FIG. 4 is a perspective view illustrating a single cascade element formed in accordance with the invention.

As indicated above, the cascade section comprises a plurality of cascade elements 32 located about the periphery of the engine nacelle, aft of the fan air compression section 21. FIG. 4 is a perspective view of a single cascade element 32 and illustrates that each cascade comprises an elongated outer panel 35 and an elongated inner panel 37. As will be better understood from the following description, when the cascade elements are in their "closed" position, the outer panels 35 form a portion of the outer wall of the nacelle 17 and the inner panels 37 form a portion of the outer wall of the fan air duct 27. In this regard, the inner and outer panels are slightly curved so that they conform to the curved configuration of their associated walls.

The inner and outer panels 35 and 37 are spaced from one another by a plurality of vanes 39. The vanes 39 are spaced, similarly curved air flow directing elements that are generally mounted orthogonal to the inner and outer panels 35 and 37. The spacing between the vanes define passageways, through which fan air flows during thrust reversal. The vanes support the inner and outer panels 35 and 37 in an offset manner whereby each cascade element 32 is generally Z-shaped in cross-section i.e., one panel projects outwardly in one direction from one side of the vanes and the other projects outwardly in the other direction from the opposed side. Support blocks 41, aligned with the cascade vanes 39, are located at either end of the overall structure, between the inner and outer panels 35 and 37. Extending longitudinally outwardly, one from each support block 41, are aligned shafts 43. The shafts 43 define the longitudinal axis of rotation of the cascade elements 32.

Located along the edges of the inner and outer panels 35 and 37 nearest the vanes 39 are stepped regions 45. The stepped regions allow adjacent panels to overlap in a manner such that a flush surface is formed when the cascade elements are in the closed position hereinafter described.

Preferably, the panels 35 and 37 and the vanes are formed of a suitable sheet metal, such as an aluminum or titanium alloy. Moreover, the blocks 41 and shafts 43 are preferably formed of suitable metals.

As illustrated in FIGS. 1, 3, 5 and 6, a plurality of cascade elements 32 are mounted in a side-by-side manner in the engine nacelle 17, aft of the fan air compression section 21. The cascade elements are mounted such that their longitudinal axes, defined by their shafts 43, lie essentially parallel to one another, split the nacelle thickness and lie parallel to the normal direction of fan air flow. As will be appreciated by those skilled in the art, the number of cascade elements is determined by the area necessary to produce adequate thrust reversal without undesirable pressure buildups occurring. This "area" is defined by the number and size of the passageways defined by the vanes. In one embodiment of the invention, 31 cascade elements [3.9 inches wide (average) by 36.0 inches long] were found adequate to provide the necessary area; however, a greater or lesser number of cascade elements may be utilized depending upon the actual environment of use of the invention, and the size of the cascade elements.

The front shafts 43 of the cascade elements are rotatably mounted in a front ring 47 and the rear shafts are rotatably mounted in an aft ring 49. The front and rear rings are attached by suitable attachment means to stringers 48 running through the nacelle, and to the panels forming the outer wall of the nacelle 17 and the outer wall of the fan air duct 27. Running between the front and aft rings 47 and 49 are support beams 51. The support beams 51 are spaced from one another. In the spaces lie the vane regions of the cascade elements. The panels of the cascade elements overlie the support beams. The support beams 51 are I-shaped in cross-section and have flanged surfaces that diverge slightly outwardly, from front to rear. At this point it should be noted that the cascade vanes 39, while being generally similar in curvature, decrease in size (converge), from front to rear.

Figure 5:
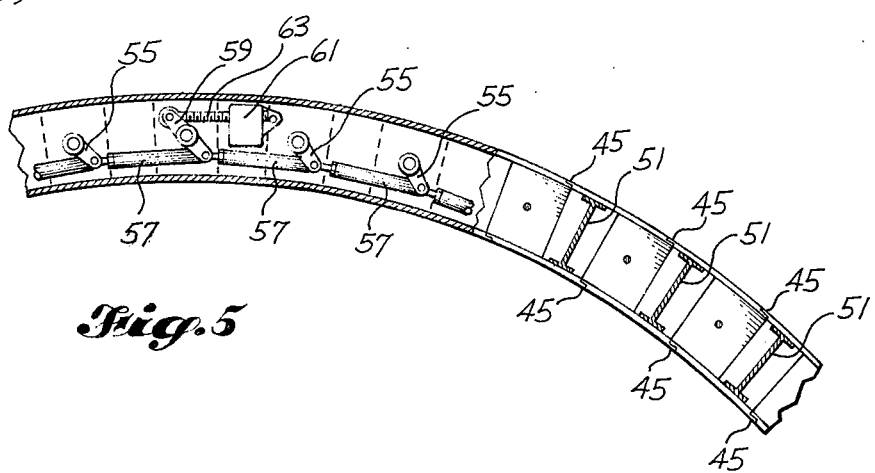
FIG. 5 is a partial cross-sectional view illustrating cascade elements formed in accordance with the invention in their closed position.
Figure 6:
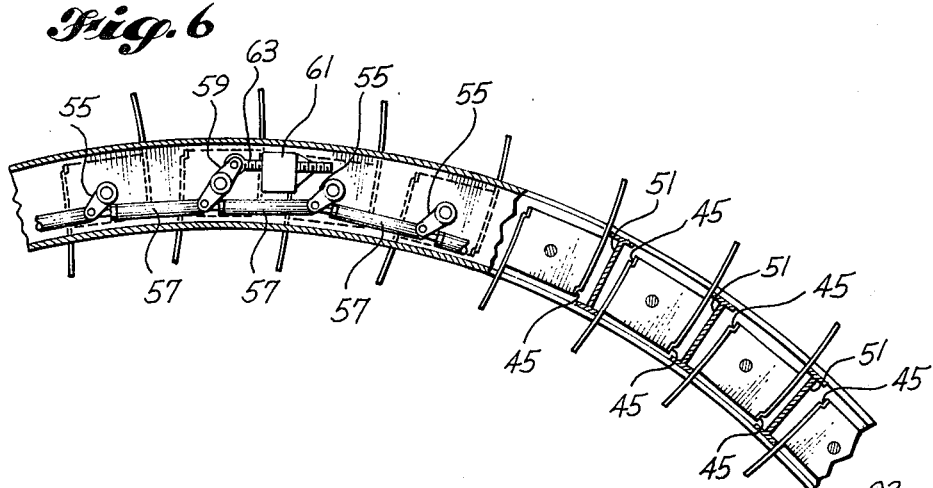
FIG. 6 is a partial cross-sectional view illustrating cascade elements formed in accordance with the invention in their open position.

The cascade elements are adapted to be rotated through an arc of approximately 90° by the mechanism hereinafter described. When in their "closed" position at one end of this arc, as illustrated in FIG. 5, the outer panels 35 form a portion of the outer wall of the nacelle 17 and the inner panels 37 form a portion of the outer wall of the fan air duct 27, adjacent panels overlapping in the manner previously described. At the other end of this arc, the cascade elements are in their open position whereat the inner and outer panels lie substantially orthogonal to the outer wall of the nacelle, as illustrated in FIG. 6. When in the open position, the outer surfaces of the cascade panels are pressed against their adjacent I-beam support elements in a sealing manner. The apertures defined between the I-beam flanges allow the rectangular corners of the cascade elements to rotate without impingement. It should be noted here that the curvature of the vanes is such that they direct fan air flowing through the passageways they define back toward the front of the nacelle i.e., they reverse the direction of normal fan air flow.

Preferably, all of the cascade elements are simultaneously rotated by a common driving mechanism. The common driving mechanism comprises a crank arm 55 extending orthogonally outwardly from one of the shafts 43 of each element (illustrated as the front shaft). The crank arms 55 are linked together at their outer ends by suitable connecting links 57. One crank arm 59 is a bilateral arm and has its nonlink connected end connected to a ball screw drive mechanism 61 (FIGS. 5 and 6). As will be understood by those skilled in the art, the ball screw drive mechanism 61 includes a threaded shaft 63 adapted to move laterally through a fixed position housing 61 as a threaded ring mounted in the housing is rotated by a suitable drive mechanism (not shown). Movement of the threaded shaft 63 in one direction or the other causes the bilateral arm 59 to rotate its associated cascade element. Because the other end of the bilateral arm 59 is connected to the other cascade elements via the links 57 and crank arms 55, all of the other cascade elements are also rotated simultaneously.

In summary, the cascade section 31 generally comprises a plurality of cascade elements located around at least a portion of the periphery of the engine nacelle 17. The cascade elements are rotatable about axes which lie generally parallel to the longitudinal axis of the engine 15. The cascade elements are formed such that when closed they form portions of the outer wall of the nacelle and the outer wall of the fan air duct. When open, the cascade elements provide pathways through which fan air can flow. Vane elements define the pathways and are formed in a manner that reverses the direction of fan air flow. Thus, a thrust reverser is formed when the cascade elements are open. It will be appreciated that because the cascade elements are formed of relatively lightweight sheet material, their overall weight is substantially less than prior art devices which include a heavy housing that must be moved longitudinally to expose cascades. Moreover, the path of travel of the cascade elements is relatively short when compared to prior art structures.

BLOCKER SECTION

Figure 10:
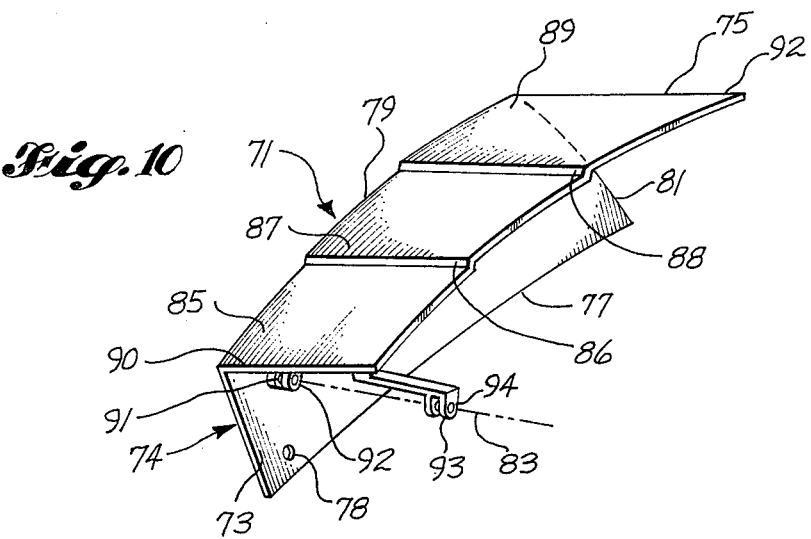
FIG. 10 is a perspective view illustrating a single blocker door formed in accordance with the invention.

The blocker section 33 generally comprises a plurality of blocker doors 71 that fan outwardly from a stowed position whereat they form a portion of the inner wall of the fan air duct to a position whereat they block the fan air duct aft of the cascade elements. FIG. 10 is a perspective view of a single blocker door 71. The blocker doors 71 are generally L-shaped in cross-section. For purposes of discussion, one of the flanges of the L-shaped section 73 is defined as a blocker flange and the other flange is defined as a fan air duct wall flange 75. The two flanges are joined together at a common edge 79. The blocker flange 73 defines two curved edges 77 and 79 that diverge with respect to one another, even though the curves generally extend in the same direction. The narrower end 74 of the blocker flange is defined as the rotation end. The outer end 81 has a radius of curvature equal to the radius of curvature of the outer wall of the fan air duct, as will be better understood from the following description. The rotation end 74 of the blocker flange 73 includes an aperture 78 in the corner remote from where it joins the fan air duct wall flange 75.

The fan air duct wall flange 75 includes three regions 85, 87 and 89 separated by steps 86 and 88. Each of the regions is substantially the same in length, extending from one end 90 to the other end 92 thereof. The purpose of the stepped regions is to allow the blocker doors to overlap when the blocker doors are in their stowed position. In this manner the stowed configuration forms a relatively smooth fan air duct wall in the region of the blocker section, as hereinafter described.

Figure 7:
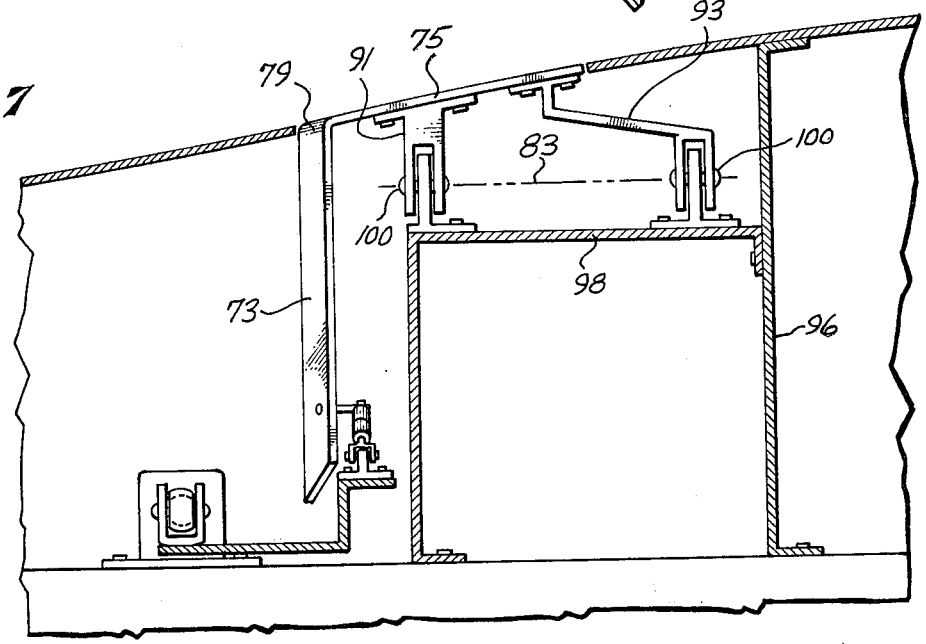
FIG. 7 is a cross-sectional view along line 7—7 of FIG. 2.

As best illustrated in FIG. 7, two arms 91 and 93 are affixed to, and extend inwardly from, the inner surface of the fan air duct wall flange 75. One arm 91 is near the common edge 79 and merely defines a yoke having aligned apertures 92 in the legs of the yoke. The other arm is near the other edge of the fan air duct wall flange 75 and extends outwardly as well as inwardly. The outer tip of the latter arm also defines a yoke having aligned apertures 94 in its legs. The apertures 92 and 94 in both yokes lie along a common axis 83. The common axis, as will be better understood from the following description, is the axis of rotation of the associated blocker door 71.

A suitable support structure 96 supports a support channel 98 about the high pressure section of the jet engine. The support channel 98 is positioned beneath the region where the blocker doors 71 form a portion of the inner wall of the fan air duct. The support channel 98 supports aligned pairs of T-shaped arms, one pair associated with each blocker door 71. The legs of the T-shaped arms extend outwardly and include apertures having a common axis. The spacing of the T-shaped arms is the same as the spacing between the yokes defined by the two arms 91 and 93 extending inwardly from the fan air duct wall flanges 75. When the blocker doors are in their operative positions, the yokes surround the outwardly extending legs of the T-shaped arms and pins 100 rotatably afix these members together.

As noted above, the blocker doors 71 are mounted so that they lie between the aft end of the cascade elements 31 and the aft end of the nacelle 17. The blocker doors are mounted such that the blocker flanges 73 lie generally orthogonal to the main longitudinal axis of the engine 15. In addition, the blocker doors are mounted such that the fan air duct wall flanges of adjacent blocker doors 71 overlap one another when the blocker doors are in their stowed positions. The blocker doors are rotatable through an arc of approximately 90° from a stowed position whereat the fan duct doors 75 overlap one another to a blocking position whereat the blocker flanges 73 lie side-by-side and prevent flow through the fan air duct 27, aft of the cascade elements 31. Rotation is about the axis 83 along which the pins 100 lie. It will be appreciated that the blocker doors, in essence, "fan" outwardly as they are moved from their stowed position to their blocking position.

Figure 2:
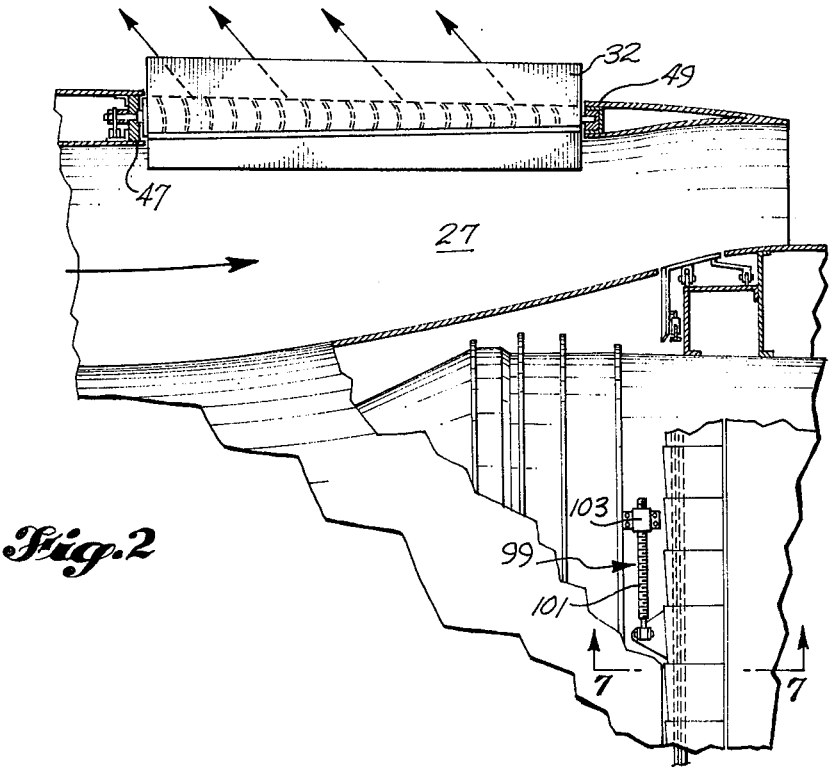
FIG. 2 is an enlarged view, partially in section, of a preferred embodiment of the invention.
Figure 3:
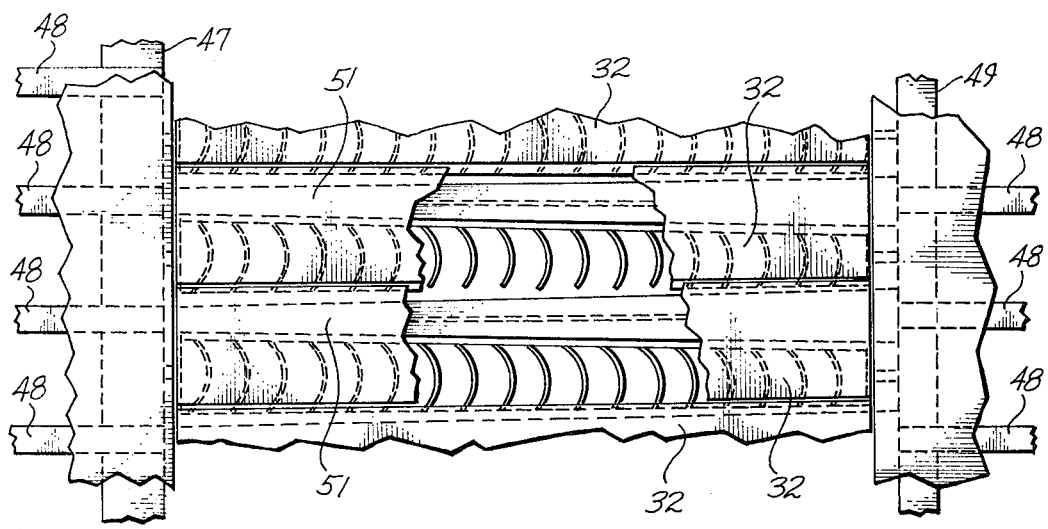
FIG. 3 is a partial plan view, partially in section, illustrating the cascade elements of the invention.
Figure 8:
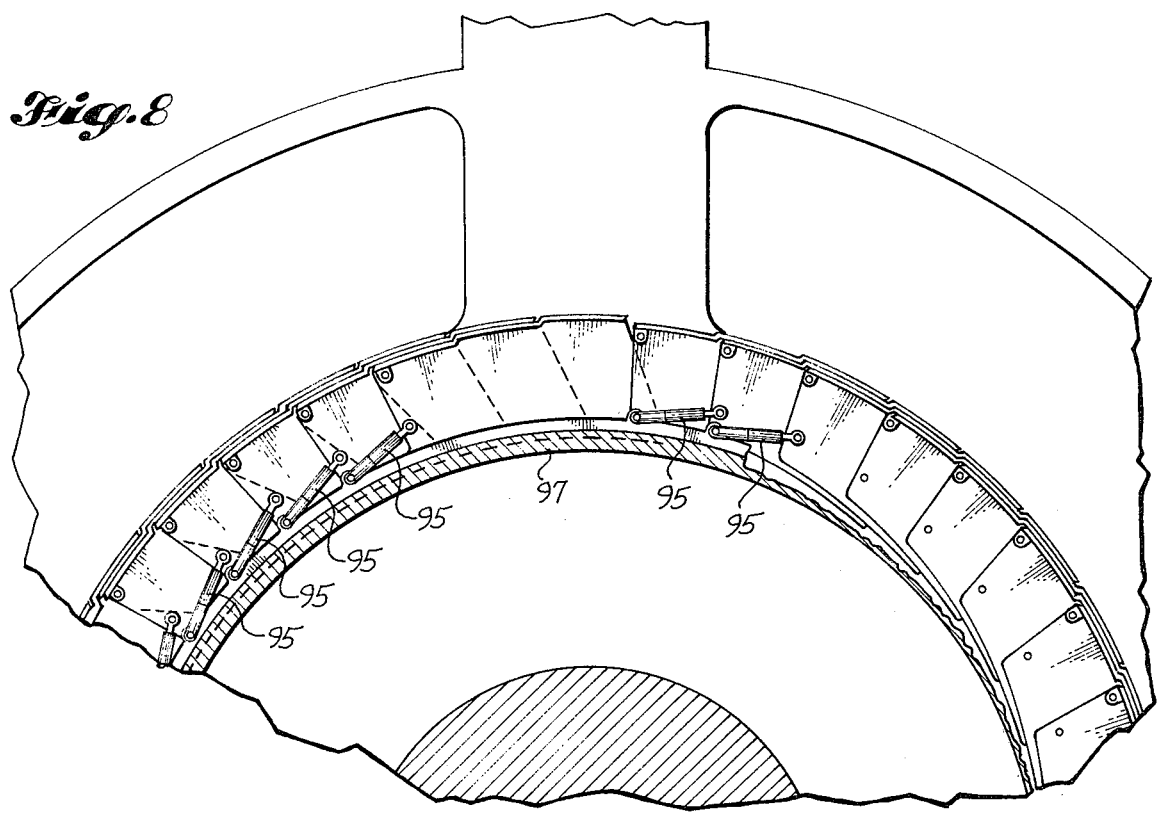
FIG. 8 is a partial cross-sectional view illustrating blocker doors formed in accordance with the invention in their fan duct open position.
Figure 9:
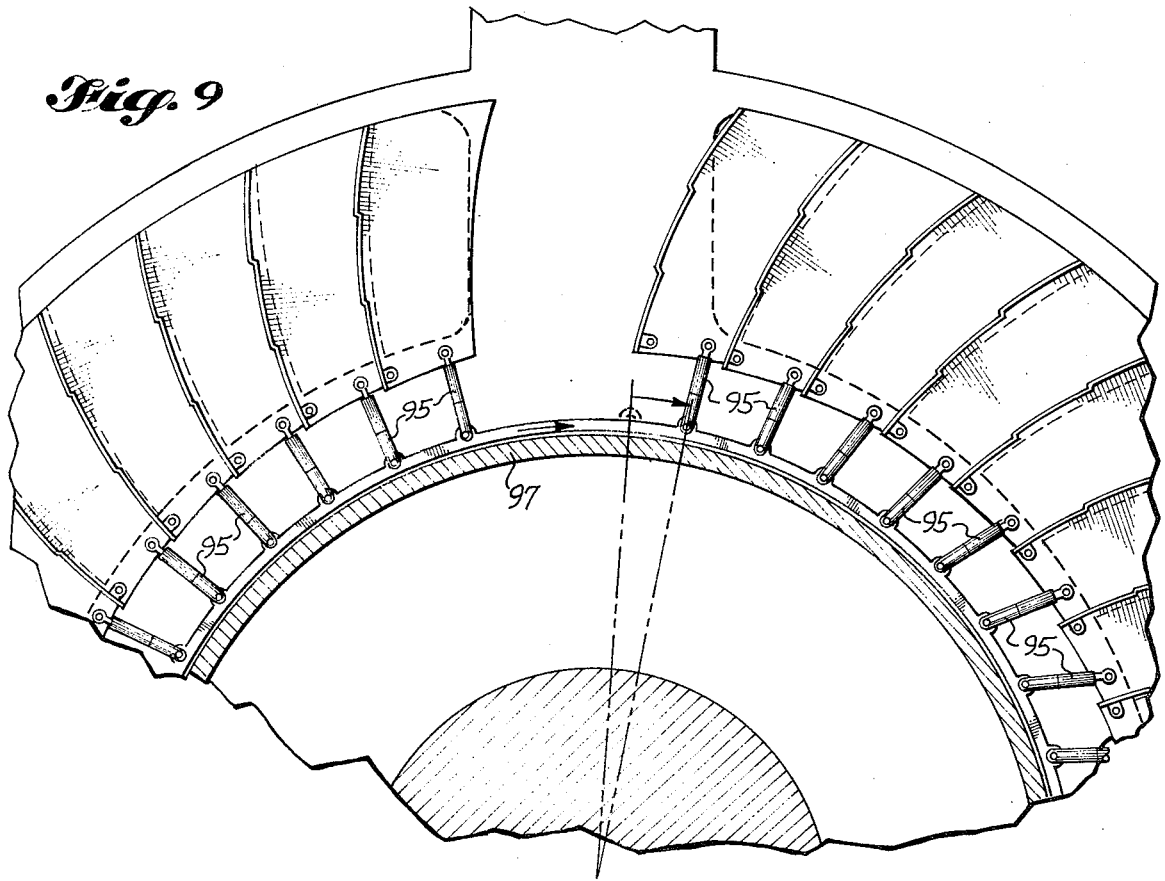
FIG. 9 is a partial cross-sectional view illustrating blocker doors formed in accordance with the invention in their fan duct closed position.

Rotation of the blocker doors is accomplished by a linking mechanism connected to the apertures 78 formed in the blocker flanges 73. The linking mechanism is best illustrated in FIGS. 8 and 9 and comprises a plurality of links 95 one associated with each blocker door 71. The links extend between their associated apertures 78 and spaced points on a ring 97 which surrounds the high pressure section 23 of the engine 15. The ring 97 is in turn connected to a ball screw mechanism 99 (FIGS. 2 and 7). The ball screw mechanism 99 comprises a threaded shaft 101 and a suitable rotating mechanism 103. When the rotating mechanism is operated by a suitable drive mechanism (not illustrated), longitudinal movement of the threaded shaft 101 occurs. This longitudinal movement, in turn, causes rotation of the ring 97. Rotation of the ring 97 in one direction causes the blocker doors to move outwardly about their axes of rotation to a position whereat they block the fan duct channel 27. Rotation in the opposite direction returns the blocker doors to a position whereat they form a portion of the inner wall of the fan duct 27. These "stowed" and "deployed" positions are illustrated in FIGS. 8 and 9, respectively. Because all of the blocker doors are all linked to a common rotatable ring, they are simultaneously moved between their blocking and nonblocking positions. Obviously, the movement of the cascade elements between their closed and open positions and the blocker doors between stowed and deployed position is preferably done simultaneously when thrust reversal is desired.

It will be appreciated from the foregoing description that the instant invention comprises a new and improved thrust reverser suitable for use with jet engines and, in particular, fan jet engines. An uncomplicated mechanism is provided for deflecting the fan air rearwardly from the fan air duct. In addition, an uncomplicated mechanism is provided for blocking the fan air duct during thrust reversal. Because the path of travel of both mechanisms is relatively short, large and complex moving mechanisms are not required.

What is claimed is:

1. A thrust reverser for a jet engine comprising a nacelle and a turbine, said nacelle surrounding said turbine in a manner such that an air duct is located aft of the turbine, said thrust reverser comprising:
    1. a cascade section including:
        a. a plurality of elongated cascade elements mounted in the nacelle of said jet engine aft of said turbine so as to be rotatably movable about spaced, generally parallel longitudinal axes that lie generally parallel to the longitudinal axis of said jet engine between a closed position whereat said cascade elements form a portion of the outer wall of said nacelle and a portion of the outer wall of the aft air duct of said jet engine and an open position whereat said cascade elements form a passageway between said aft air duct and the exterior of said nacelle, each of said cascade elements including a plurality of spaced, curved vanes lying along their respective longitudinal axes and positioned so as to direct air from said aft air duct generally toward the air intake end of said jet engine when said cascade elements are in their open position, said plurality of cascade elements each further including inner and outer panels affixed to and mounted on opposed edges of said spaced, curved vanes such that said plurality of spaced, curved vanes and said inner and outer panels rotate together as said cascade elements rotate about said spaced, generally parallel longitudinal axes, said inner and outer panels positioned such that said inner panels form said portion of the outer wall of said air duct and said outer panels form said portion of the outer wall of said nacelle when said cascade elements are in their closed positions; and
        b. cascade element movement means attached to said cascade elements for moving said cascade elements between their open and closed positions; and
    2. an aft air duct blocker section including:
        a. A plurality of blocker elements mounted in said aft air duct aft of said cascade section so as to be movable between a closed position whereat said blocker elements form a door adapted to block said aft air duct and an open position whereat said blocker elements are retracted to a position which allows air to flow through said aft air duct in a normal manner; and,
        b. duct blocker movement means connected to said plurality of blocker elements for moving said plurality of blocker elements between their closed and open positions.

2. A thrust reverser for a jet engine as claimed in claim 1, wherein said inner and outer panels extend outwardly on opposite sides of said spaced, curved vanes and include undercut regions along their edges nearest said spaced, curved vanes, said undercut regions adapted to allow adjacent panels to overlie one another in a manner such that flush surfaces between said panels exists when said cascade elements are in their closed positions.

3. A fan air thrust reverser for a fan jet engine comprising a nacelle and a turbine that includes a high pressure section and a fan air section, said nacelle surrounding said turbine in a manner such that an air duct located aft of the fan air section is defined by the inner wall of said nacelle and the outer fairing of said high pressure section, said fan air thrust reverser comprising:
    1. a cascade section including:
        a. a plurality of elongated cascade elements mounted in the nacelle of said fan jet engine aft of said fan air section so as to be rotatably movable about spaced, generally parallel longitudinal axes that lie generally parallel to the longitudinal axis of said jet engine between a closed position whereat said cascade elements form a portion of the outer wall of said nacelle and a portion of the outer wall of the fan air duct of said jet engine and an open position whereat said cascade elements form a passageway between said fan air duct and the exterior of said nacelle, each of said cascade elements including a plurality of spaced, curved vanes lying along their respective longitudinal axes and positioned so as to direct fan air from said fan air duct generally toward the air intake end of said fan jet engine when said cascade elements are in their open position, said plurality of cascade elements each further including inner and outer panels affixed to and mounted on opposed edges of said spaced, curved vanes such that said plurality of spaced, curved vanes and said inner and outer panels rotate together as said cascade elements rotate about said spaced, generally parallel longitudinal axes, said inner and outer panels positioned such that said inner panels form said portion of the outer wall of said air duct and said outer panels form said portion of the outer wall of said nacelle when said cascade elements are in their closed positions; and,
        b. cascade element movement means attached to said cascade elements for moving said cascade elements between their open and closed positions; and
    2. a fan air duct blocker section including:
        a. a plurality of blocker elements mounted in said fan air duct aft of said cascade section so as to be movable between a closed position whereat said blocker elements form a door adapted to block said fan air duct and an open position whereat said blocker elements are retracted to a position which allows air to flow through said fan air duct in a normal manner; and, b. fan duct blocker movement means connected to said plurality of blocker elements for moving said plurality of blocker elements between their closed and open positions.

4. A fan air thrust reverser for a fan jet engine as claimed in claim 3, wherein said inner and outer panels extend outwardly on opposite sides of said spaced, curved vanes and include undercut regions along their edges nearest said spaced, curved vanes, said undercut regions adapted to allow adjacent panels to overlie one another in a manner such that flush surfaces between said panels exists when said cascade elements are in their closed positions.

5. A fan air thrust reverser for a fan jet engine as claimed in claim 4, wherein each of said cascade elements includes aligned first and second shafts, one extending outwardly from either end along their respective longitudinal axes, said cascade elements being rotated between their open and closed positions about their respective first and second shafts.

6. A fan air thrust reverser for a fan jet engine as claimed in claim 5, wherein said cascade element movement means comprises: a plurality of link means equal in number to said plurality of cascade elements, one of said plurality of link means being attached to one of said first and second shafts of each of said cascade elements on a one-to-one basis, said link means also being attached together; and, a driving mechanism connected to said link means for simultaneously moving said link means and their associated cascade elements.

7. A fan air thrust reverser for a fan jet engine as claimed in claim 6, wherein said blocker elements are generally L-shaped in cross-section and define blocker flanges and fan air duct wall flanges, said plurality of blocker elements being mounted in said fan air duct about the outer periphery of said turbine section in a manner such that said blocker flanges lie in a plane generally orthogonal to the longitudinal axis defined by said fan jet engine and said fan air duct wall flanges overlie one another when said blocker elements are in their closed position, said blocker elements being mounted so as to be rotatable outwardly from a position where said fan air duct wall flanges form a portion of the inner wall of said fan air duct to a position whereat said blocker flanges block said fan air duct immediately rearwardly of said cascade section.

8. A fan air thrust reverser for a fan jet engine as claimed in claim 7, wherein said fan duct blocker movement means comprises:
a ring surrounding said high pressure section of said fan jet engine near said blocker elements;
a plurality of links equal in number to said blocker elements, one link connecting each blocker element to a point in said ring; and,
driving means connected to said ring so as to rotate said ring, the rotation of said ring causing said blocker elements to simultaneously move between their respective open and closed positions.

9. A fan air thrust reverser for a fan jet engine comprising a nacelle and a turbine that includes a high pressure section and a fan air section, said nacelle surrounding said turbine in a manner such that an air duct located aft of the fan air section is defined by the inner wall of said nacelle and the outer fairing of said high pressure section, said fan air thrust reverser comprising:
1. a cascade section including:
a. a plurality of cascade elements mounted in the nacelle of said fan jet engine aft of said fan air section so as to be movable between a closed position whereat said cascade elements form a portion of the outer wall of said nacelle and a portion of the outer wall of the fan air duct of said fan jet engine and an open position whereat said cascade elements form a passageway between said fan air duct and the exterior of said nacelle, each of said cascade elements including at least one curved vane formed and mounted so as to direct fan air from said aft fan duct generally toward the air intake end of said fan jet engine when said cascade elements are in their open position; and,
b. cascade element movement means attached to said cascade elements for moving said cascade elements between their open and closed position; and,
2. a fan duct block section including:
a plurality of blocker elements mounted in said fan air duct aft of said cascade section so as to be movable between a closed position whereat said blocker elements form a door adapted to block said fan air duct and an open position whereat said blocker elements are retracted to a position which allows fan air to flow through said fan air duct in a normal manner, said blocker elements being generally L-shaped in cross-section and defining blocker flanges and fan air duct wall flanges, said plurality of blocker elements being mounted in said fan air duct about the periphery of said turbine section in a manner such that said blocker flanges lie in a plane generally orthogonal to the longitudinal axis defined by said jet engine and said fan air duct wall flanges overlie one another when said blocker elements are in their closed position, said blocker elements being mounted so as to be rotatable outwardly from said open position whereat said fan air duct wall flanges form a portion of the inner wall of said fan air duct to said closed position whereat said blocker flanges block said fan air duct immediately rearwardly of said cascade section; and
b. fan duct blocker movement means connected to said plurality of blocker elements for moving said plurality of blocker elements between their closed and open positions.

10. A fan air thrust reverser for a fan jet engine as claimed in claim 9, wherein said fan duct blocker movement means comprises:
a ring surrounding said high pressure section of said fan jet engine near said blocker elements;
a plurality of links equal in number to said blocker elements, one link connecting each blocker element to a point in said ring; and,
driving means connected to said ring so as to rotate said ring, the rotation of said ring causing said blocker elements to simultaneously move between their respective open and closed positions.

11. A cascade element suitable for use in a jet engine to provide an exhaust flow path adapted to reverse the direction of airflow, said cascade element comprising:
a pair of panels spaced from one another; and a plurality of generally similarly curved vanes, said plurality of generally similarly curved vanes permanently affixed to said pair of panels so as to be spaced from one another and lie generally orthogonal to said panels, said panels and said curved vanes being spaced such that passageways are defined between said panels and adjacent vanes, said vanes being curved and positioned such that air flowing through said passageways is substantially reversed in its direction of movement.

12. A cascade element as claimed in claim 11, wherein said plurality of generally similarly curved vanes lie along a common longitudinal axis; and, wherein said cascade element includes first and second shafts extending outwardly from either end thereof and lying along said common longitudinal axis.

13. A cascade element as claimed in claim 12, wherein said panels extend outwardly in generally parallel planes lying on opposite sides of said vanes and include undercut regions formed in the edges thereof nearest said vanes, said undercut regions formed in a manner such that when two cascade elements are mounted in a side-by-side manner and suitably positioned, the outwardly extending panel on one side of one element lies in an undercut region of the adjacent panel of the other element, and vice versa with respect to the panels on the other side of said cascade elements.

14. A blocker door suitable for blocking the fan air duct of a fan jet engine comprising: a plurality of L-shaped blocker door elements, each including a blocker flange and a fan air duct wall flange, rotatably mounted in said fan air duct so as to be movable between a closed position whereat said blocker flanges block said fan air duct and an open position whereat said fan air duct wall flanges overlie one another and allow air to flow through said fan air duct; and, including fan air duct blocker movement means for simultaneously moving said blocker door elements between said open and closed positions.

15. A blocker door as claimed in claim 14, wherein said fan duct blocker movement means comprises:
a ring surrounding said high pressure section of said fan jet engine near said blocker door elements;
a plurality of links equal in number to said blocker door elements, one link connecting each blocker element to a point in said ring; and,
driving means connected to said ring so as to rotate said ring, the rotation of said ring causing said blocker door elements to simultaneously move between their respective open and closed positions.

* * * * *